3,250,741
POLYETHYLENE STABILIZED WITH 4,4'-METHYL-
ENEBIS(2 METHYL-6-TERT-BUTYLPHENOL)
Thomas H. Coffield, Farmington, and Allen H. Filbey,
Walled Lake, Mich., assignors to Ethyl Corporation,
New York, N.Y., a corporation of Virginia
No Drawing. Filed May 27, 1958, Ser. No. 738,014
2 Claims. (Cl. 260—45.95)

This invention relates to the stabilization of saturated hydrocarbon polymers against oxidative deterioration.

It is an object of this invention to provide a superior oxidation inhibitor for saturated hydrocarbon polymers. A further object is to provide improved saturated hydrocarbon polymer compositions containing an oxidation inhibitor.

The above and other objects of this invention are accomplished by a solid composition of matter comprising a saturated hydrocarbon synthetic polymer derived by polymerization of an aliphatic monoolefin hydrocarbon compound having up to four carbon atoms and a small antioxidant quantity, up to about 5 percent, of 4,4'-methylenebis(2-methyl-6-tert-butylphenol). This inhibitor has the formula

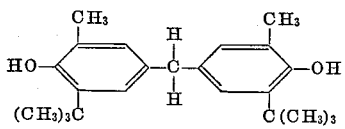

The saturated hydrocarbon synthetic polymers which achieve greatly enhanced oxidative stability by the practice of this invention, include polymers obtained from the polymerization of a hydrocarbon monoolefin having up to 4 carbon atoms. Examples of such monomers include ethylene, propylene, butylene and isobutylene. Thus the polymers are homopolymers and copolymers of ethylene, propylene, butylene and isobutylene.

A preferred embodiment of this invention is polyethylene containing a small antioxidant quantity, up to about 5 percent of 4,4'-methylenebis(2-methyl-6-tert-butylphenol). A particularly preferred embodiment comprises polyethylene containing from about 0.02 to about 2 percent 4,4' - methylenebis(2 - methyl - 6 - tert - butylphenol). This embodiment is particularly preferred since polymeric compositions of outstanding oxidative stability result from the employment of 4,4'-methylenebis(2-methyl-6-tert-butylphenol) in polyethylene in these quantities.

Polyethylene is a hydrocarbon polymer derived from the polymerization of ethylene. This polymerization can be accomplished by a great variety of methods which lead to products of diverse properties. Polyethylene of any nature may advantageously be utilized for preparing compositions according to the present invention. The polymers of ethylene which are employed may, for example, be similar to those which may be obtained by polymerizing ethylene in a basic aqueous medium and in the presence of polymerization-favoring quantities of oxygen under relatively high pressures in excess of 500 or 1,000 atmospheres at temperatures between 150 and 275° C. Or, if desired, they may be similar or identical to the essentially linear and unbranched polymers ordinarily having greater molecular weights which may be obtained under relatively low pressures of 1 to 100 atmospheres using such catalysts to polymerize the ethylene as mixtures of strong reducing agents and compounds of Group IVB, VB and VIB metals of the Periodic System; chromium oxide on silicated alumina; hexavalent molybdenum compounds; and charcoal supported nickel-cobalt. The polyethylene which results from these various polymerization processes may have a molecular weight in the range from 1300 to over 1,000,000 depending on the particular conditions of polymerization employed.

The benefits derived from the practice of this invention are demonstrated by comparative oxidation tests of uninhibited polyethylene and polyethylene containing the 4,4' - methylenebis(2 - methyl - 6 - tert-butylphenol) antioxidant of this invention. These tests are conducted as follows: The selected amount of antioxidant is blended with the polyethylene by milling a weighed quantity of plastic pellets on a warm roll-mill. The weighed quantity of antioxidant is added to the mill after the polyethylene has been premilled for a short period of time. The plastic containing the antioxidant is then added in weighed quantity to a standard size vessel and melted to give a surface of reproducible size. The vessel is then inserted into a chamber which may be sealed and which is connected to a capillary tube leading to a gas buret and leveling bulb. The apparatus is flushed with oxygen at room temperature, sealed, and the temperature is raised to 150° C. The oxygen pressure is maintained at 1 atmosphere by means of a leveling bulb. The oxygen upstake at the elevated temperature is recorded until sharp increase in oxygen uptake occurs. This procedure has been adopted since it has been found that many compounds may inhibit the oxidation for a certain induction period after which time a very sharp increase in the rate of oxygen uptake occurs indicating that the antioxidant has been exhausted. In tests of this nature it is found that the compositions of this invention have greatly increased "induction periods." For example, a sample of polyethylene with no added antioxidant was tested according to this procedure and was found to take up oxygen rapidly with no initial induction period. After 20 hours of heating, over 45 milliliters of oxygen had been absorbed. When, however, 0.5 percent of 4,4' - methylenebis(2 - methyl - 6 - tert - butylphenol) was added to an equal quantity of the same polyethylene, less than 5 milliliters of oxygen were taken up after 60 hours of heating. The induction period before a sudden increase in oxygen uptake was over 65 hours. This test indicates that 4,4'-methylenebis(2-methyl-6-tert-butylphenol) is an outstanding antioxidant for polyethylene.

There are several methods available for preparing the inhibited hydrocarbon polymer compositions of this invention. Thus, the blending of the 4,4'-methylenebis(2-methyl-6-tert-butylphenol) with a polymer such as, for example, polyethylene, may be carried out on open rolls, on internal mixers or may be accomplished by mixing with extrusion. It is also possible to prepare concentrated batches of the polymer containing excessive amounts of 4,4'-methylenebis(2-methyl-6-tert-butylphenol) and then mix the concentrate with additional polymer to prepare a composition of this invention. The preferred method of compounding the polymers is by milling on heated open rolls at slightly elevated temperatures by methods well-known to the art. The temperature range employed is sometimes critical as certain polyethylenes will not melt at low temperatures and tend to stick to the rolls at high temperatures. The 4,4' - methylenebis(2-methyl-6-tert-butylphenol) may be initially mixed with the polymer in the dried salts or it may be first dissolved in a suitable solvent, then sprayed on the polymer and milled in.

Examples of the hydrocarbon polymer compositions of this invention prepared as described above, follow. All parts and percentages are by weight in these examples.

*Example I*

To 1000 parts of polyethylene produced by oxygen catalyzed reaction under a pressure of 20,000 atmospheres and having an average molecular weight of 40,000 is added and mixed 2 parts of 4,4'-methylenebis(2-methyl-6-tert-butylphenol). The resulting composition has greatly increased oxidative stability.

Example II

With 200 parts of polyisobutylene having an average molecular weight of 100,000 is blended 1.0 part of 4,4'-methylenebis(2-methyl-6-tert-butylphenol).

Example III

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 4,4'-methylenebis(2-methyl-6-tert-butylphenol).

Example IV

A linear polyethylene having a high degree of crystallinity (about 93 percent) and below 1 ethyl branched chain per hundred carbon atoms, a density of about 0.96 gram per milliliter and which has about 1.5 double bonds per 100 carbon atoms is treated with $50 \times 10^{-6}$ roentgens of $\beta$-radiation. To the thus irradiated polymer is added 0.005 percent 4,4'-methylenebis(2-methyl-6-tert-butylphenol) and the resulting product has better stability characteristics.

Example V

To a polyethylene having an average molecular weight of 1500, a melting point of 88–90° C. and a specific gravity of 0.92 is added 1 percent of 4,4'-methylenebis(2-methyl-6-tert-butylphenol). After milling in the antioxidant an extremely oxidative resistant product results.

Example VI

Two parts of 4,4'-methylenebis(2-methyl-6-tert-butylphenol) are added with milling to 100 parts of a low density polyethylene prepared by high pressure polymerization and which has an average molecular weight of about 20,000. The resulting product is vastly improved in its oxidative stability.

Example VII

To 10,000 parts of a polyethylene having an average molecular weight of about 100,000 and which has a tensile strength of 5400 p.s.i., a Shore D hardness of 70 and a softening temperature of 130° C. under low load is added ten parts of 4,4'-methylenebis(2-methyl-6-tert-butylphenol) to prepare a composition of outstanding oxidative stability.

Example VIII

To the polyethylene in Example III is added 0.05 percent 4,4'-methylenebis(2-methyl-6-tert-butylphenol). The resulting composition has improved antioxidant characteristics.

Example IX

To a polyisobutylene polymer having an average molecular weight of 35,000 is added sufficient 4,4'-methylenebis(2-methyl-6-tert-butylphenol) to give a composition containing 0.03 percent of the antioxidant. The composition has improved antioxidant properties due to the presence of 4,4'-methylenebis(2-methyl-6-tert-butylphenol).

Example X

A polypropylene is compounded with 0.5 percent of 4,4'-methylenebis(2-methyl-6-tert-butylphenol) to prepare a stable composition of this invention.

In addition to 4,4'-methylenebis(2-methyl-6-tert-butylphenol) the saturated hydrocarbon polymers of this invention may contain other compounding and coloring additives including minor proportions of carbon black, elastomers, polyvinyl compounds, carboxylic acid esters, urea-aldehyde condensation products, flame retarding agents such as antimony trioxide and chlorinated hydrocarbons and various pigment compositions designed to impart color to the finished product.

The antioxidant of this invention is conveniently prepared by the reaction of 2-methyl-6-tert-butylphenol with formaldehyde in the presence of an alkali metal hydroxide catalyst and using a monohydric alcohol as a solvent. This process is exemplified by the following example.

Example XI

In a reaction vessel equipped with stirring means, condensing means, thermometer and reagent introducing means was placed a solution of 6.6 parts of potassium hydroxide dissolved in 400 parts of isopropanol. To this solution was added 164 parts of 2-methyl-6-tert-butylphenol and 45.3 parts of 37 percent formalin solution while maintaining an atmosphere of nitrogen in the reaction vessel. The reaction mixture was heated for 2½ hours, cooled and poured into 1500 parts of cold water. The organic material was extracted with ethyl ether, the ether solution dried over magnesium sulfate and evaporated leaving a pale yellow liquid which slowly solidified to give a white crystalline product, melting point 96.5 to 98.5° C. This product was 4,4'-methylenebis(2-methyl-6-tert-butylphenol). Calculated for $C_{23}H_{32}O_2$: carbon, 81.1 percent; hydrogen, 9.47 percent. Found: carbon, 80.6 percent; hydrogen, 9.3 percent. The compound is soluble in water and has varying degrees of solubility in various organic solvents.

We claim:

1. As a new composition of matter, solid polyethylene containing a small antioxidant quantity, up to about 5 percent, of 4,4'-methylenebis(2-methyl-6-tert-butylphenol).

2. As a new composition of matter, solid polyethylene containing as an antioxidant from about 0.02 to about 2 perecent of 4,4'-methylenebis(2-methyl-6-tert-butylphenol).

References Cited by the Examiner

UNITED STATES PATENTS

| | | | |
|---|---|---|---|
| 2,675,366 | 4/1954 | Pullman | 260—45.95 |
| 2,734,088 | 2/1956 | Knowles et al. | 260—619 |
| 2,807,653 | 9/1957 | Filbey et al. | 260—619 |
| 2,820,775 | 1/1958 | Chamberlain et al. | 260—45.95 |
| 2,835,650 | 5/1958 | Nelson | 260—45.95 |
| 2,875,174 | 2/1959 | Webb | 260—810 |
| 2,985,617 | 5/1961 | Salyer et al. | 260—45.95 |

LEON J. BERCOVITZ, *Primary Examiner.*

HAROLD N. BURSTEIN, MILTON STERMAN, ARNOLD M. BOETTCHER, ALFONSO D. SULLIVAN,
*Examiners.*

F. M. VAN RIET, S. H. BLECH, H. W. HAEUSSLER, H. E. TAYLOR, *Assistant Examiners.*